Jan. 4, 1955 — R. W. HALL — 2,698,629
PORTABLE VEHICLE SHELTER
Filed June 16, 1953 — 4 Sheets-Sheet 1

Inventor
R. W. HALL
By Ross J. Woodward
Attorney

Jan. 4, 1955
R. W. HALL
2,698,629
PORTABLE VEHICLE SHELTER
Filed June 16, 1953
4 Sheets-Sheet 2
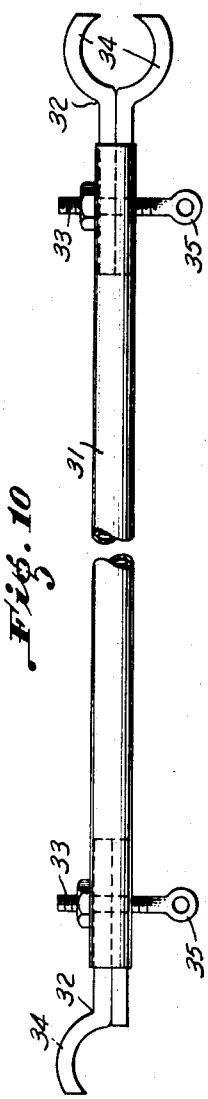
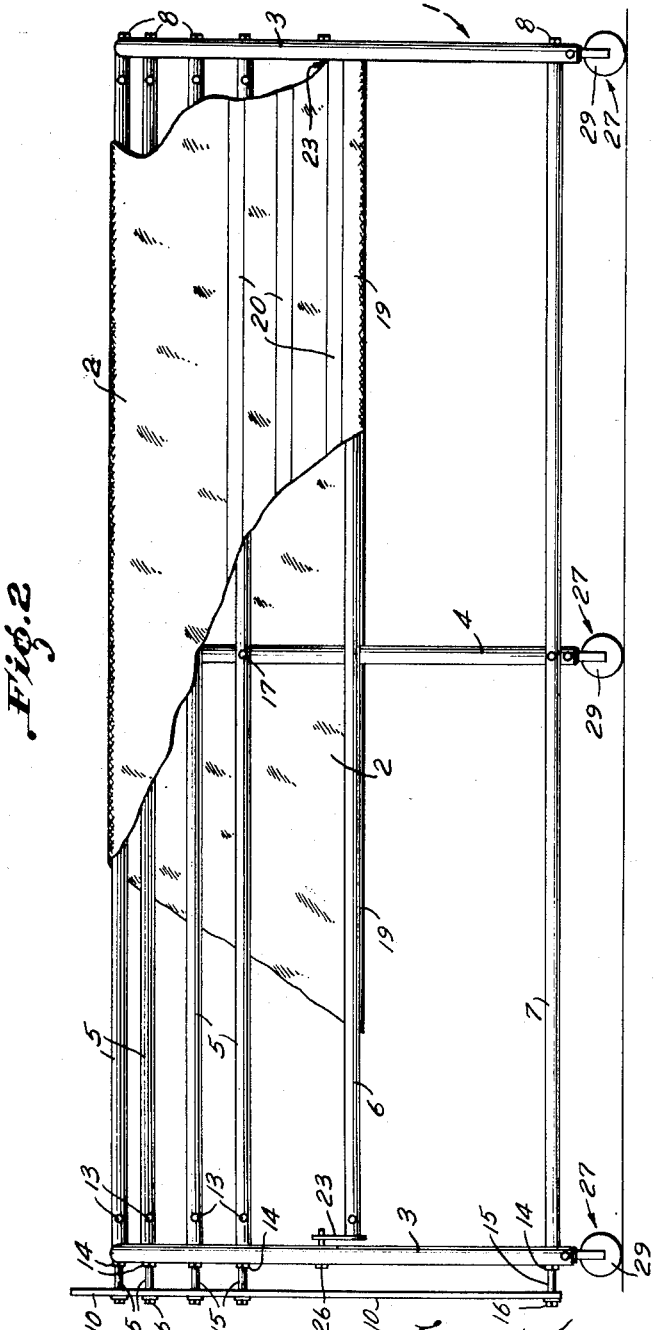
Inventor
R. W. HALL
By Ross J. Woodward
Attorney

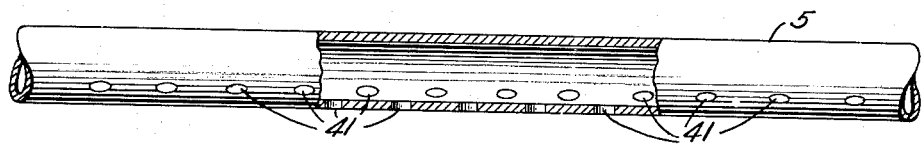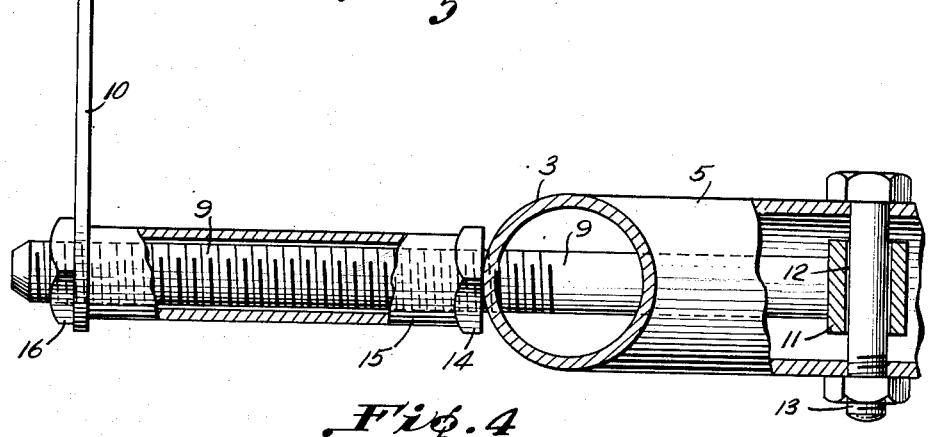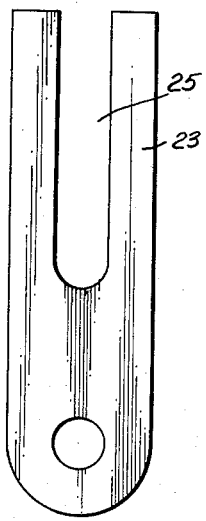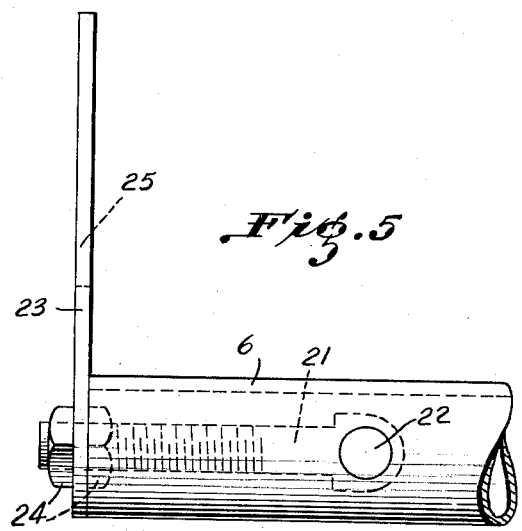

Jan. 4, 1955 R. W. HALL 2,698,629
PORTABLE VEHICLE SHELTER
Filed June 16, 1953 4 Sheets-Sheet 4

Inventor
R. W. HALL
By Ross J. Woodward
Attorney

United States Patent Office 2,698,629
Patented Jan. 4, 1955

2,698,629

PORTABLE VEHICLE SHELTER

Robert W. Hall, Louisville, Ky., assignor of one-half to Joseph L. Ortner, Cincinnati, Ohio Application June 16, 1953, Serial No. 361,939

7 Claims. (Cl. 135—5)

This invention relates to a portable car port or shelter for automobiles and other motor vehicles and it is one object of the invention to provide a shelter of improved construction which is of light weight and readily shiftable from one place to another, the shelter having a frame formed of metal tubes or pieces which are joined together by improved securing means which firmly hold the tubes assembled but permit them to be easily and quickly taken apart when the device is to be stowed upon trailer, truck, van, or other vehicle and transported from one place to another.

Another object of the invention is to provide a car port or shelter which is not only serviceable as a shelter for an automobile but may also be used as a lawn canopy for adults or as a covered play space for children.

Another object of the invention is to provide a device of this character wherein the tubes are connected with each other by couplings of an improved construction which firmly hold longitudinally extending bars or tubes to vertically disposed yokes and may be very easily loosened when the tubular bars and yokes are to be taken apart.

Another object of the invention is to provide a car shelter wherein a cover of duck, canvas, or other suitable fabric is placed upon the erected frame, certain of the longitudinally extending bars of the frame being passed through hems along opposite side edges of the cover and serving as weights to stretch the cover transversely of the frame and hold the cover taut.

Another object of the invention is to provide improved fixtures for connecting ends of the bars passed through hems of the cover with side arms of the yokes and allow vertical movement of the bars but prevent accidental complete disconnection of the side bars from the yokes.

The invention is illustrated in the accompanying drawings wherein:

Fig. 2 is a side elevation with portions of the fabric cover broken away.

Fig. 3 is a view showing a portion of a sprinkler tube or pipe partially in side elevation and partially in longitudinal section.

Fig. 4 is a fragmentary view showing the manner in which a trellis at the front end of the car port or shelter is mounted.

Fig. 5 is a fragmentary view of one end portion of a side bar of the car port or shelter.

Fig. 6 is a view in front elevation of the slide plate mounted at the end of the side bar shown in Fig. 5.

Fig. 10 is a view in elevation of a cross bar used when moving the car port or shelter from one place to another.

Figure 1:
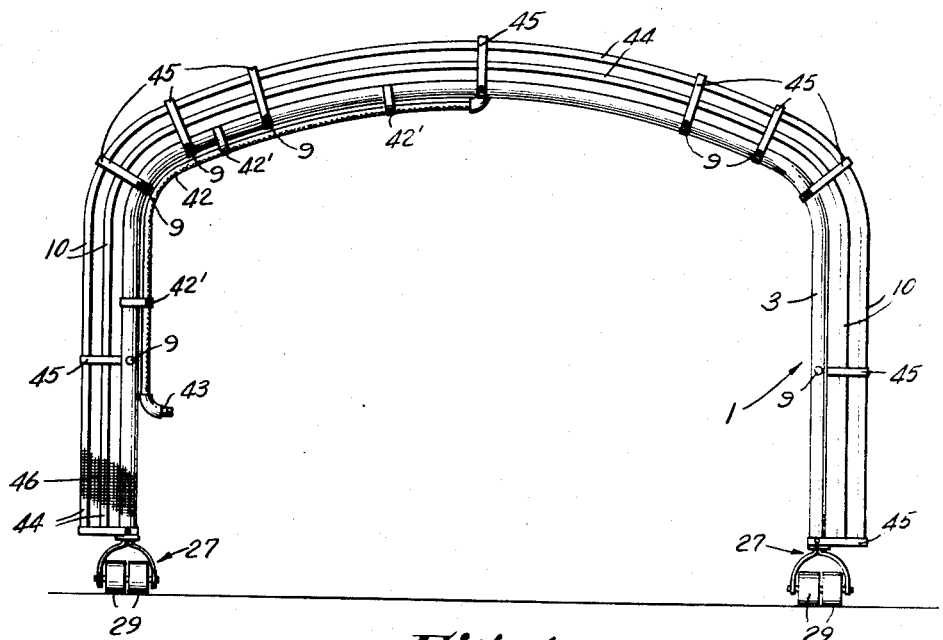
Fig. 1 is an end view of the car port or shelter.

This car port or shelter has a frame indicated in general by the numeral 1 and over which is disposed a cover 2 formed of duck, canvas or other suitable materials. The frame may be of any dimensions desired but in actual practice it has been found that a shelter ten feet wide and between seventeen and eighteen feet long will accommodate automobiles of standard size.

The frame is formed of tubes of strong but light weight metal which is rustproof and will not be damaged by rain, snow, or ice. Yokes 3 which are of inverted U-shaped formation are provided at front and rear ends of the frame and midway the length of the frame there has been shown an intermediate yoke 4, it being understood that additional intermediate yokes may be provided if so desired. Tubular bars 5 forming top supports extend longitudinally of the frame between bridge portions of the end yokes and across the bridge portion of the intermediate yoke and there have also been provided upper and lower side bars 6 and 7 formed of metal tubes. Rear ends of the bars 5 and 7 are detachably secured to the rear yoke by fasteners which are preferably bolts 8 and front ends of these bars are detachably secured to the front yoke by bolts 9 which are similar to the bolts 8 but of greater length so they may project forwardly from the front yoke and carry a trellis 10 which is of inverted U-shape but may be formed of solid metal instead of tubing.

The bolts 8 and 9 are eye-bolts and of the construction shown in Fig. 4. Referring to this figure, it will be seen that the bolt 9 shown therein extends axially of the bar 5 and at its inner end is formed with a head 11 through which extends an opening 12 to receive a pin or bolt 13 passed through the bar 5 transversely thereof. The eye bolts pass through the end yoke against which dished ends of the bars 5 have abutting engagement. Nuts 14 are applied to the bolts for clamping engagement with the yoke and about protruding portions of the bolts are fitted spacing sleeves 15 so that the trellis strip which is then applied to the bolts and secured by nuts 16 will be held in spaced relation to the front yoke. The bolts which secure the bars to the rear yoke are of the same construction as those used for front ends of the bars but shorter as a trellis is not provided at the rear end of the frame. If the trellis is omitted, short bolts may be used for both ends of the bars. Bolts or other suitable fasteners 17 are used for detachably securing the bars to the intermediate yoke.

The cover 2 may consist of a single sheet of duck, canvas, or other suitable material and is of sufficient length and width to extend the full length of the frame between the end yokes and entirely across bridge portions of the yokes with its side portions extending downwardly along opposite sides of the frame. Narrow hems 18 are formed along ends of the cover and its side edge portions are turned and sewed to form wide hems which are open at their ends and of sufficient width to receive the upper side bars 6 of the frame. Stripes 20 of aluminum paint have been shown alongside portions of the cover for ornamental purposes. The side bars 6 project from opposite ends of the hems 19 and each end portion of each bar carries an eye bolt 21 which is secured at its inner end by a pin 22 passed transversely through the bar. Threaded ends of the eye bolts protrude from ends of the bar and each carries a plate 23 which is clamped between nuts 24 and projects upwardly from the bar. The plates 23 are each formed with a slot 25 leading from its upper end so that the plates may be slidably engaged with bolts 26 passed through the side arms of the yokes. The bars 6 hold opposite side portions of the cover close to the frame and as the plates 23 may slide vertically relative to the bolts 26 the bars will serve as weights which apply downward pull upon side edges of the cover and cause the cover to be stretched transversely and held taut in close fitting contact with the frame. One of the plates must be removed in order to pass a bar 6 through the hem in which it fits and then replaced but the other plate may be left upon the bar as it is disposed outwardly of the hem when the bar is passed through the hem.

Figure 8:
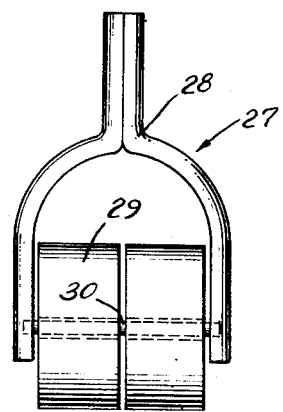
Fig. 8 is a view of one of the castors.
Figure 9:
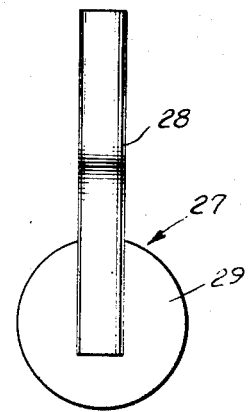
Fig. 9 is a view of the castor taken at right angles to Fig. 8.
Figure 7:
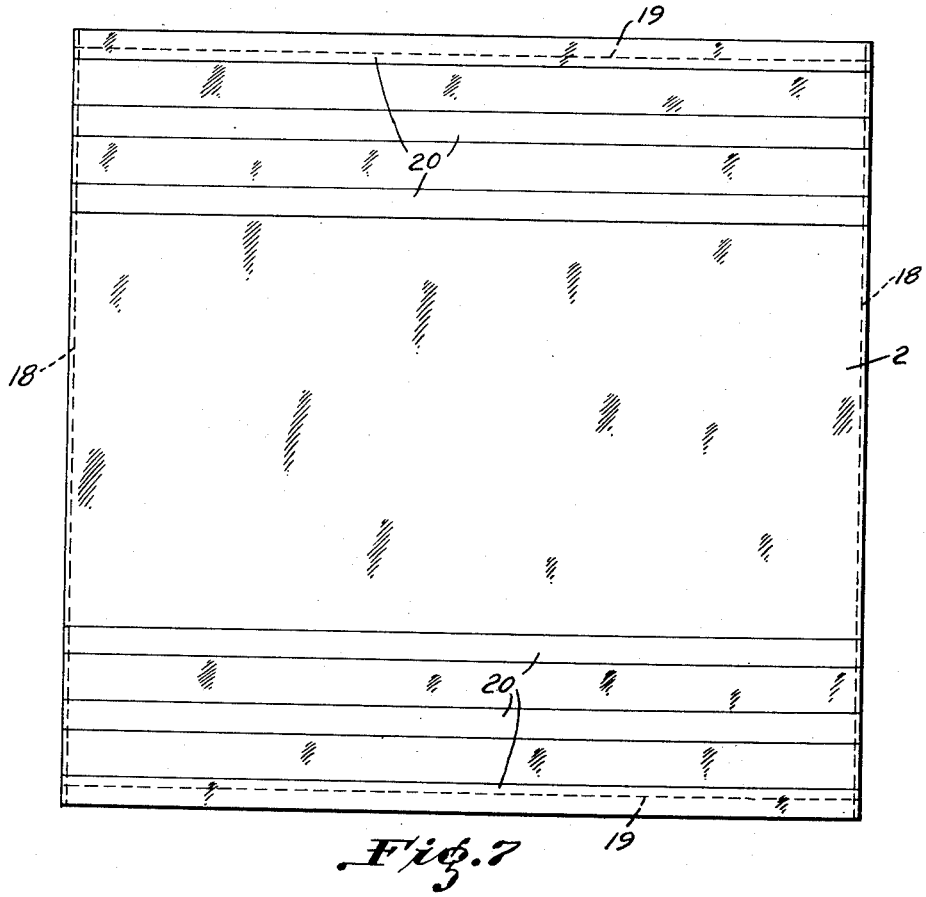
Fig. 7 is a view showing the fabric cover in a flattened position.

In order that the shelter may be readily moved along a driveway or across a yard from one place to another there have been provided castors 27 at lower ends of the side arms of the yokes. These castors are of the construction shown in Figures 8 and 9 and referring to these figures, it will be seen that each castor has a harp 28 formed of stiff metal and carrying a pair of large rollers 29 which are disposed between forks of the harp and rotatably mounted by a pin 30. The rollers are formed of cresoted gum or other suitable tough material and are of such width that they may roll along a driveway or across a lawn without becoming scarred. Therefore, the shelter may be very easily moved from one place to another.

Figure 11:
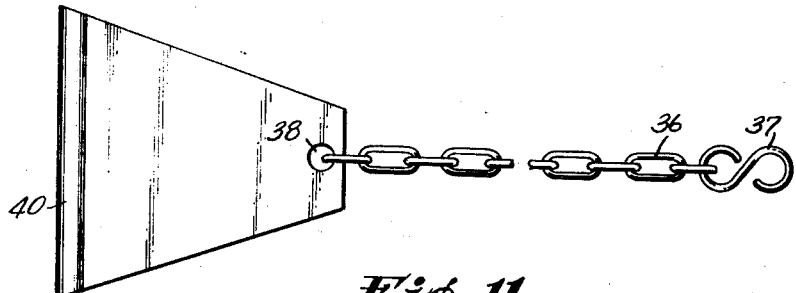
Fig. 11 is a view of a towing chain.
Figure 12:
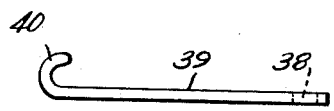
Fig. 12 is an edge view of the hook at one end of the towing chain shown in Fig. 11.

When the shelter is to be moved from one place to another, it is towed by an automobile which is connected with either end of the frame and attached to a pulling bar 31 which is temporarily mounted between side arms of an end yoke. The pulling bar is of tubular formation and open at both ends so that shackles 32 may be fitted into its end portions. The bar is of such length that it may be readily set in place between side arms of an end yoke and the shackles are each formed of stiff metal rods which are fitted into the pulling bar in side by side relation to each other and secured by an eye bolt 33. Outer portions of the rods are bent to form jaws 34 which engage about the arms of the yoke. The eyes 35 of the eye bolts are presented outwardly of the frame and since the bolts are located near opposite ends of the pulling bar, pull exerted by chains connected with the bolts will be evenly distributed and the shelter will be moved along a driveway without being subjected to side strains which would be detrimental to the frame. The chains are each of the construction shown in Figure 11 and referring to this figure, it will be seen that each chain 36 is passed through the eye 35 of the bolt 33 with which the chain is detachably connected. At its other end the chain is engaged through the opening 38 formed in a hook 39. This hook is formed of stiff sheet metal and of triangular formation. The wider end of the hook is bent to form a bill 40 which may engage the upper edge portion of a bumper at either the front or rear of an automobile. The width of the end portion of the hook which is formed with the bill 40 prevents the hook from having free rocking motion upon the car bumper and therefore when the car is moved away from the shelter, pull will be exerted in such a manner that the shelter will be readily towed along a driveway or across a lawn to a desired location and will follow the direction in which the automobile moves.

This car port or shelter is not only useful as a shelter which is used instead of a garage but may also be used when washing an automobile. In order that a washing operation may be conveniently performed, the center one of the longitudinally extending bars 5 of the frame is formed with a multiplicity of openings or perforations 41 which are spaced from each other throughout the length of the pipe as shown in Fig. 3. This pipe therefore serves as a sprinkler pipe from which water is discharged downwardly upon an automobile under the shelter and the automobile may be conveniently washed. A pipe 42 which may be rubber or metal has one end connected with the perforated pipe 5 and extends laterally therefrom and downwardly along a side portion of one of the yokes, which is preferably the center yoke, and is secured thereto by clamps 42'. At its lower end the pipe 42 is provided with a coupling 43 with which a garden hose may be connected and thus supply water to the sprinkler pipe. While it has been stated that the sprinkler pipe is the center one of the longitudinally extending pipes 5, it will be obvious that additional ones of these pipes may be perforated and the pipe 42 connected with them as well as with the center pipe.

The trellis 10 at the front end of the frame serves as an ornament for the shelter and consists of a suitable number of bars or strips 44 of inverted U-shape. These strips are disposed in spaced relation to each other and are engaged with the mounting strips or clamps 45 which are formed at their inner ends with openings through which outer ends of the eye bolts 9 pass. Wire screening 46 may be applied to the strips 44 for the full length thereof and detachably secured in any desired manner and if desired, ornamental articles may be applied to the wire mesh. Other ornamental devices, such as potted plants or the like, may also be made use of and set at rest upon shelters carried by the frame.

Having thus described the invention, what is claimed is:

1. A vehicle shelter comprising an elongated frame having longitudinally extending bars and vertical transversely disposed yokes with which said bars are removably connected, certain of said bars being disposed at opposite sides of the yokes and detachably mounted for limited vertical sliding movement, a removable cover of pliable material extending along said frame substantially the full length thereof with side portions extending downwardly at opposite sides of the frame and provided with hems, said vertically slidable bars passing through said hems and constituting weights exerting downward pull and holding the cover stretched transversely and in close fitting engagement with the frame, and rollers carried by said yokes and mounting the shelter for movement from one place to another.

2. A vehicle shelter comprising a frame open at opposite ends and having a top portion and side portions, a cover for said frame formed of pliable material and extending substantially the full length thereof with portions extending downwardly at opposite sides of the frame and provided with hems, bars passed through said hems with ends protruding therefrom, members detachably connecting ends of said bars with portions of the frame and mounting the bars for vertical movement relative to the frame whereby the bars serve as weights and exert stretching pull upon the cover.

3. A vehicle shelter comprising a frame including vertically disposed supports and longitudinally extending bars detachably connected with said supports, certain of said bars being tubular and disposed at opposite sides of the frame in upwardly spaced relation to the bottom of the frame, a flexible cover for said frame having portions extending downwardly at opposite sides thereof and formed with hems through which said side bars pass, bolts carried by the tubular side bars and protruding from ends thereof, plates removably carried by said bolts and extending upwardly therefrom and provided with slots leading from their upper ends, and members carried by said supports and slidably passing through said slots and mounting the plates and the side bars for vertical movement whereby the side bars serve as weights and exert downward pull upon the cover and hold the cover stretched tight and in close fitting engagement with the frame.

4. The structure of claim 3 wherein the bolts carried by the side bars have eyes at inner ends through which pass pins passing through the side bars transversely thereof, the plates carried by the bolts bearing against ends of the side bars and being disposed between and firmly gripped by inner and outer nuts threaded upon the bolts.

5. The structure of claim 3 wherein the bolts carried by the side bars have eyes at inner ends through which pass pins passing through the side bars transversely thereof, the plates carried by the bolts being removable therefrom whereby upon removing a plate at one end of a bar the bar may be passed through a hem of the cover and the plate reapplied and firmly secured in position extending upwardly therefrom.

6. A vehicle shelter comprising a frame having vertically disposed longitudinally spaced supports of inverted U-shape and longitudinally extending bars spaced transversely from each other and detachably connected with legs and bridge portions of said supports, a flexible cover for said frame extending along the frame between ends thereof and having side portions extending downwardly at opposite sides of the frame and bars carried by and extending along side edge portions of said cover and slidably connected with legs of certain of said supports and constituting means for exerting downward pull upon said cover along opposite side edges thereof and holding the cover in close fitting engagement with the frame.

7. A vehicle shelter comprising a frame having vertically disposed longitudinally spaced transversely disposed supporting yokes, one of said yokes being disposed at each end of the frame, longitudinally extending bars for the frame having ends in abutting engagement with the said yokes at ends of the frame, bolts carried by said bars and projecting from ends thereof and passing through the end yokes and carrying nuts securing the bolts through the yokes, a removable cover for said frame, and bars carried by and removably mounted along side edge portions of said cover and slidably connected with the end yokes and exerting downward pull upon the cover and snugly holding the cover upon the frame.

References Cited in the file of this patent

UNITED STATES PATENTS

| | | |
|---|---|---|
| 1,061,547 | Kennedy et al. | May 13, 1913 |
| 1,183,391 | Mason | May 16, 1916 |
| 1,732,989 | Scrabeck | Oct. 22, 1929 |
| 2,568,048 | Arnold | Sept. 18, 1951 |